US008344564B2

United States Patent
Yoshida et al.

(10) Patent No.: US 8,344,564 B2
(45) Date of Patent: Jan. 1, 2013

(54) DRIVE DEVICE (75) Inventors: Tadafumi Yoshida, Toyota (JP); Masaki Yoshino, Toyota (JP); Yutaka Hotta, Chiryu (JP)

(73) Assignees: Toyota Jidosha Kabushiki Kaisha, Aichi-ken (JP); Aisin AW Co., Ltd., Aichi-ken (JP)

( * ) Notice: Subject to any disclaimer, the term of this patent is extended or adjusted under 35 U.S.C. 154(b) by 451 days.

(21) Appl. No.: 12/602,059

(22) PCT Filed: May 27, 2008

(86) PCT No.: PCT/JP2008/060121
§ 371 (c)(1),
(2), (4) Date: Nov. 25, 2009

(87) PCT Pub. No.: WO2008/146943
PCT Pub. Date: Dec. 4, 2008

(65) Prior Publication Data
US 2010/0127586 A1 May 27, 2010

(30) Foreign Application Priority Data
May 29, 2007 (JP) .................................. 2007-142184

(51) Int. Cl.
H02K 5/22 (2006.01)
(52) U.S. Cl. .............................. 310/71; 310/89; 310/112
(58) Field of Classification Search .................... 310/71, 310/113, 67 R, 68 R, 89, 102 R, 428, 112, 310/80, 83, 114, 268
See application file for complete search history.

(56) References Cited

U.S. PATENT DOCUMENTS

| 2002/0079763 A1* | 6/2002 | Fleshman et al. ............... 310/87 |
| 2004/0226761 A1 | 11/2004 | Takenaka et al. |
| 2005/0208782 A1* | 9/2005 | Reed et al. ...................... 439/34 |
| 2007/0096571 A1* | 5/2007 | Yuratich ......................... 310/87 |

FOREIGN PATENT DOCUMENTS

| JP | 8-223884 A | 8/1996 |
| JP | 2004-147412 A | 5/2004 |
| JP | 2004-343845 A | 12/2004 |
| JP | 2006-14477 A | 1/2006 |

* cited by examiner

*Primary Examiner* — Quyen Leung
*Assistant Examiner* — Eric Johnson
(74) *Attorney, Agent, or Firm* — Sughrue Mion, PLLC (57) ABSTRACT

A driving device (100) is provided with first and second rotating electrical machines (MG1, MG2); an inverter (30); a first storing case (23) having a first rotating electrical machine storing section (21) for storing the first rotating electrical machine (MG2), and an inverter storing section (300) for storing the inverter (30); and a second storing case (13) which can store the second rotating electrical machine (MG1) and can be attached to the first storing case (23); a first terminal section (121) connected to the inverter; and a second terminal section (15) which is arranged on the second storing case (13) and is connected to the second rotating electrical machine (MG1). The first terminal section (121) and the second terminal section (15) are arranged so that one protrudes toward the other.

3 Claims, 6 Drawing Sheets

DRIVE DEVICE

TECHNICAL FIELD

The present invention relates to a drive device, and particularly to a drive device configured by combining a plurality of housing cases housing a rotating electric machine and an inverter.

BACKGROUND ART

Conventionally, various types of drive devices have been proposed in which an inverter and a plurality of motors are housed in separate case portions for integration of the plurality of motors and the inverter.

For example, Japanese Patent Laying-Open No. 2004-343845 discloses a drive device provided with a drive device case which is formed by connecting the case portions to each other that house the electric motors, respectively, and an inverter case attached to this drive device case and housing inverters corresponding to their respective electric motors.

The drive device case includes a front case housing a generator, a rear case housing a motor, and a rear cover.

The lead wires from the generator and the motor each are connected through the bus bar and the terminal. Each terminal projects from inside the front case or the rear case into the inverter case, and has one end connected to the bus bar connected to the inverter and the other end connected to the lead wire of the generator or the motor.

However, in the above-described conventional drive device, the connection between the lead wire and the terminal and the connection between the bus bar and the terminal should be performed separately from the operation of assembling each of the cases, which poses a problem that the assembly process of the drive device becomes extremely complicated.

DISCLOSURE OF THE INVENTION

The present invention has been made in light of the above-described problems, and an object thereof is to provide a drive device by which the assembly process thereof is simplified.

The drive device according to the present invention includes first and second rotating electric machines; an inverter capable of supplying electric power to the first and second rotating electric machines; a first housing case having a first rotating electric machine housing portion capable of housing the first rotating electric machine and an inverter housing portion capable of housing the inverter; a second housing case capable of housing the second rotating electric machine and capable of being attached to the first housing case. The drive device also includes a first terminal portion provided at the first housing case and connected to the inverter, and a second terminal portion provided at the second housing case and connected to the second rotating electric machine. Furthermore, the first terminal portion and the second terminal portion are arranged such that one of the terminal portions projects toward the other of the terminal portions. The first housing case is attached to the second housing case to allow the first terminal portion and the second terminal portion to be connected to each other.

Preferably, the drive device further includes a first mounting surface provided at the first housing case and attached to the second housing case, and a second mounting surface provided at the second housing case and attached to the first mounting surface. The first terminal portion is housed within the first housing case, and the second terminal portion projects from the second mounting surface toward the first terminal portion.

Preferably, the first housing case includes an insertion portion capable of receiving the second terminal portion and having the first terminal portion disposed therein and, with respect to the insertion portion, a detachable portion detachably provided in a face located with respect to the direction in which the insertion portion extends.

Preferably, the second terminal portion is housed within the second housing case, and the first terminal portion projects from the first mounting surface toward the second terminal portion.

Preferably, the second housing case includes an insertion portion capable of receiving the first terminal portion and having the second terminal portion disposed therein and, with respect to the insertion portion, a detachable portion detachably provided in a face located with respect to the direction in which the insertion portion extends.

The drive device according to the present invention allows the operation of assembling the drive device to be simplified.

BEST MODES FOR CARRYING OUT THE INVENTION

Referring to FIGS. 1 to 6, a drive device 100 according to the present embodiment and a vehicle provided with drive device 100 will be hereinafter described.

It is to be noted that the same or corresponding components are designated by the same reference characters, and description thereof will not be repeated. With regard to the embodiments described below, in the case where reference is made to the number of pieces, amount or the like, the scope of the present invention is not necessarily limited to the number, amount or the like unless otherwise specified. Further, in the following embodiments, each component is not necessarily essential to the present invention unless otherwise specified. Furthermore, in the case where a plurality of embodiments are provided in the following, it is originally intended that features of the embodiments are appropriately combined unless otherwise specified.

Figure 1:
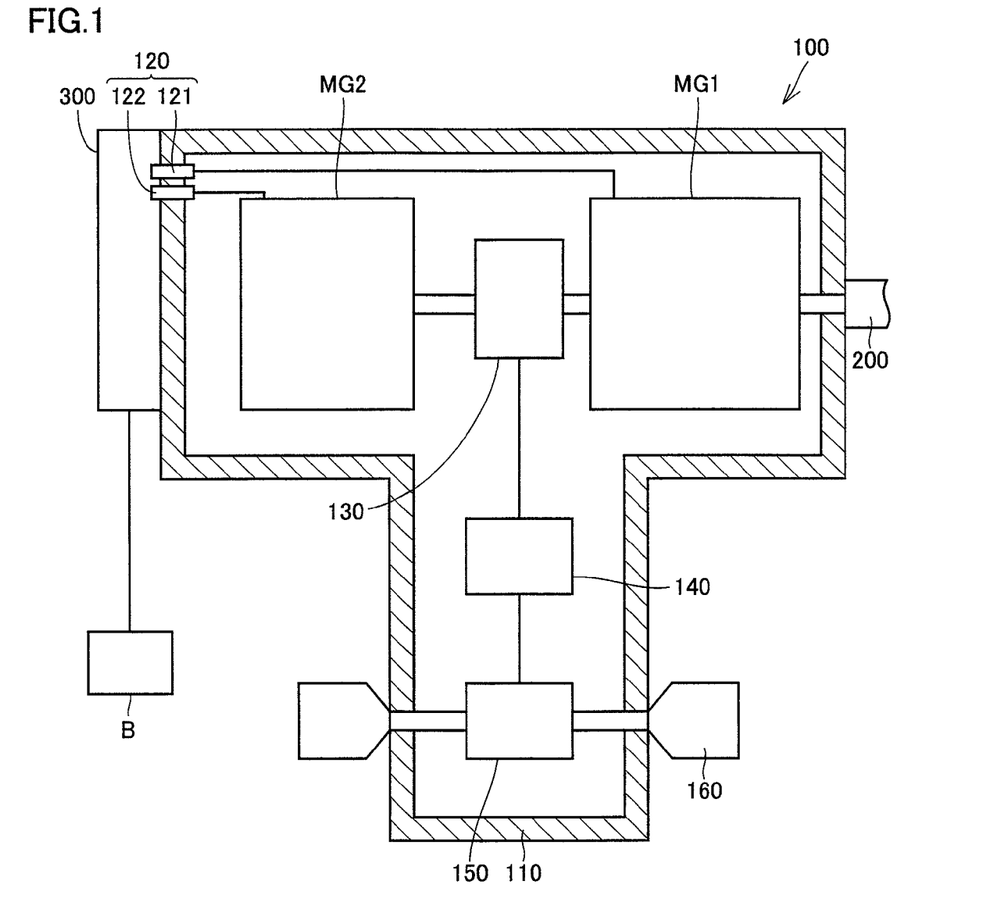
FIG. 1 is a schematic diagram showing a configuration of a drive device of a vehicle to which a mounting structure according to an embodiment is applied.

FIG. 1 is a schematic diagram showing the configuration of a drive device 100 to which a mounting structure according to the present embodiment is applied. Referring to FIG. 1, drive device 100 which serves to drive a hybrid vehicle is configured to include motor generators MG1 and MG2, a housing 110, a terminal portion 120, a planetary gear 130, a reduction gear 140, a differential gear 150, and a drive shaft receiving portion 160. Motor generators MG1 and MG2, planetary gear 130, reduction gear 140, and differential gear 150 are provided within housing 110.

Motor generators MG1 and MG2 each correspond to a rotating electric machine having a function of at least one of the electric motor and the electric generator, and are each configured to include a rotation shaft, a stator, and a rotor fixed to the rotation shaft.

A plurality of stator teeth are formed in the stator of each of motor generators MG1 and MG2. A plurality of turns of each of a U-phase coil, a V-phase coil and a W-phase coil are wound around each of these stator teeth.

Planetary gear 130 as a "power split device" includes a sun gear, a ring gear and a planetary carrier (which are not shown). The sun gear in planetary gear 130 is connected to the rotation shaft of motor generator MG1. The ring gear in planetary gear 130 is connected to the rotation shaft of motor generator MG2. The planetary carrier in planetary gear 130 is connected to a shaft 200 through which the power output from the engine is transmitted. The power of the ring gear in planetary gear 130 is then transmitted to reduction gear 140.

Reduction gear 140 is disposed between planetary gear 130 and differential gear 150. Differential gear 150 is connected to a drive shaft via drive shaft receiving portion 160.

Terminal portion 120 includes terminals 121 and 122. Motor generators MG1 and MG2 are connected to a PCU (Power Control Unit) 300 via terminals 121 and 122, respectively, provided in housing 110. PCU 300 is integrated with drive device 100. PCU 300 is electrically connected to a battery B through a cable. This causes battery B to be electrically connected to motor generators MG1 and MG2.

While the hybrid vehicle is running, the power output from the engine is transmitted to shaft 200 and divided into two paths by planetary gear 130.

One of the above-described two paths serves as a path for transmission from reduction gear 140 through differential gear 150 to drive shaft receiving portion 160. The driving force transmitted to drive shaft receiving portion 160 is transmitted as rotating force through the drive shaft to the driving wheels for driving the vehicle.

The other of the paths serves to drive motor generator MG1 for electric power generation. Motor generator MG1 generates electric power by the power of the engine split by planetary gear 130. The electric power generated by motor generator MG1 is variously used in accordance with the running state of the vehicle and the conditions of battery B. For example, at the time of the normal running and the sudden acceleration of the vehicle, the electric power generated by motor generator MG1 is used as electric power for driving motor generator MG2. On the other hand, under the conditions specified for battery B, the electric power generated by motor generator MG1 is stored in battery B through the inverter and the converter that are provided in PCU 300.

The driving operation of motor generator MG2 is carried out using at least one of the electric power stored in battery B and the electric power generated by motor generator MG1. The driving force of motor generator MG2 is transmitted from reduction gear 140 through differential gear 150 to drive shaft receiving portion 160. This allows the driving force of the engine to be assisted by the driving force from motor generator MG2, and also allows the hybrid vehicle to be driven only by the driving force from motor generator MG2.

During regenerative braking of the hybrid vehicle, the driving wheels are rotated by the inertial force of the vehicle body. Motor generator MG2 is driven by the rotating force from the driving wheels through drive shaft receiving portion 160, differential gear 150 and reduction gear 140. At this time, motor generator MG2 operates as an electric generator. Thus, motor generator MG2 serves as a regenerative brake for converting braking energy into electric power. The electric power generated by motor generator MG2 is stored in battery B via the inverter provided within PCU 300.

Figure 2:
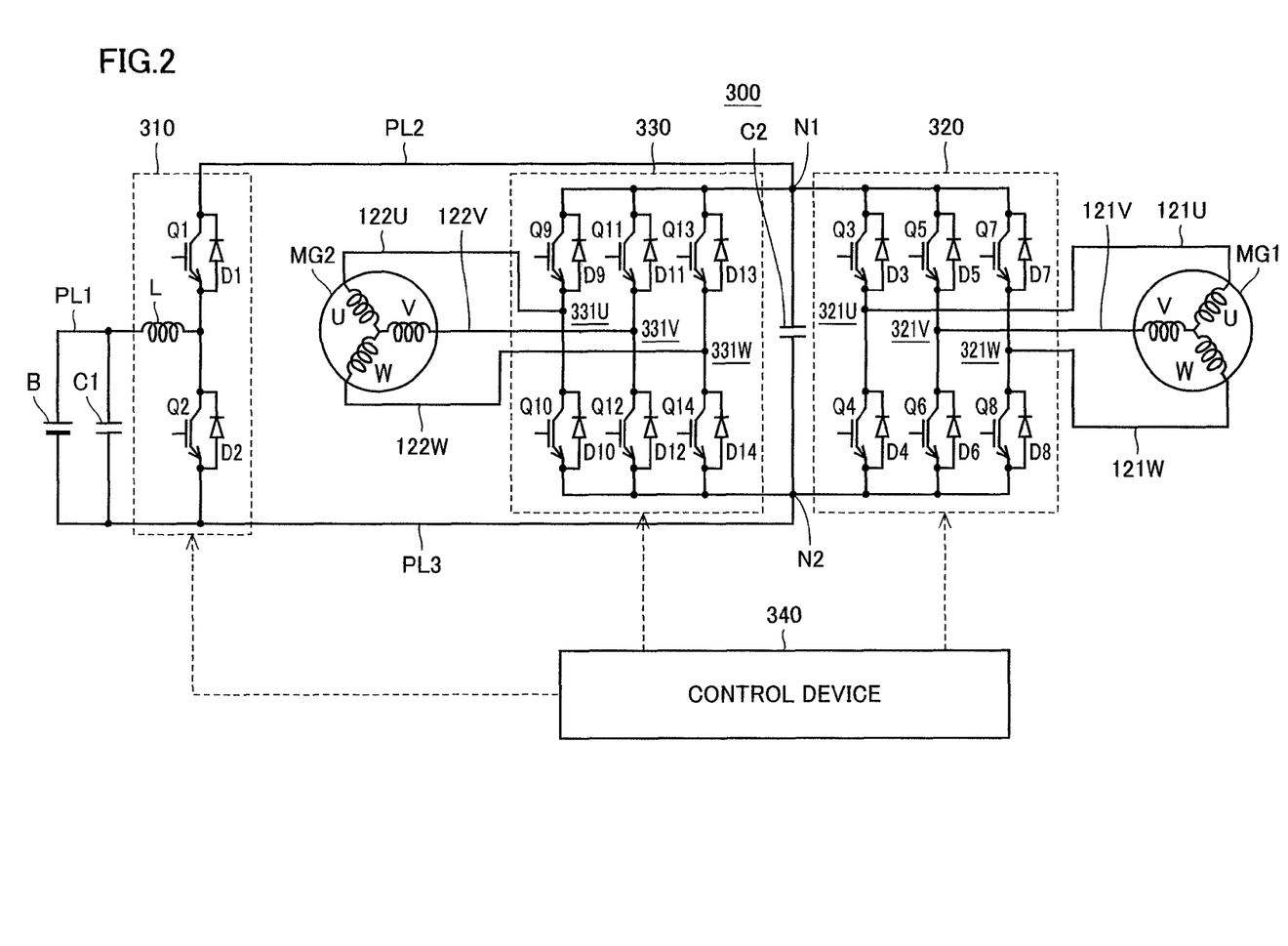
FIG. 2 is a circuit diagram showing a configuration of a main part of a PCU.

FIG. 2 is a circuit diagram showing the configuration of a main part of PCU 300. Referring to FIG. 2, PCU 300 is configured to include a converter 310, inverters 320 and 330, a control device 340, and capacitors C1 and C2. Converter 310 is connected between battery B and inverters 320, 330. Inverters 320 and 330 are connected to motor generators MG1 and MG2, respectively.

Converter 310 includes power transistors Q1 and Q2, diodes D1 and D2, and a reactor L. Power transistors Q1 and Q2 are connected in series and each have a base receiving a control signal from control device 340. Diodes D1 and D2 are connected between the collector and the emitter of each of power transistors Q1 and Q2, respectively, to supply current from the emitter side to the collector side of each of power transistors Q1 and Q2. Reactor L has one end connected to a power supply line PL1 which is connected to the positive electrode of battery B, and has the other end connected to the connecting point between power transistors Q1 and Q2.

Converter 310 uses reactor L to boost the direct-current (DC) voltage received from battery B, and supplies the boosted voltage to a power supply line PL2.

Furthermore, converter 310 lowers the DC voltage received from inverters 320 and 330 to charge battery B.

Inverters 320 and 330 include U-phase arms 321U and 331U, V-phase arms 321V and 331V, and W-phase arms 321W and 331W, respectively. U-phase arm 321U, V-phase arm 321V and W-phase arm 321W are connected in parallel between a node N1 and a node N2. Similarly, U-phase arm 331U, V-phase arm 331V and W-phase arm 331W are connected in parallel between node N1 and node N2.

U-phase arm 321U includes two power transistors Q3 and Q4 connected in series. Similarly, U-phase arm 331U, V-phase arms 321V and 331V, and W-phase arms 321W and 331W each include two series-connected power transistors of power transistors Q5 to Q14, respectively. Furthermore, diodes D3 to D14 are connected between the collector and the emitter of each of power transistors Q3 to Q14, respectively, to supply current from the emitter side to the collector side.

The intermediate points of the phase arms of inverter 320 are connected to the phase ends of the phase coils of motor generator MG1 through a U-phase terminal 121U, a V-phase terminal 121V and a W-phase terminal 121W, respectively. In motor generator MG1, three coils of the U-, V- and W-phases each have one end connected in common to a neutral point.

Furthermore, the intermediate points of the phase arms of inverter 330 are connected to the phase ends of the phase coils of motor generator MG2 through a U-phase terminal 122U, a V-phase terminal 122V and a W-phase terminal 122W, respectively. In motor generator MG2, three coils of the U-, V- and W-phases each have one end connected in common to a neutral point.

Capacitor C1 is connected between power supply lines PL1 and PL3, and smoothes the voltage level of power supply line PL1. Capacitor C2 is connected between power supply lines PL2 and PL3, and smoothes the voltage level of power supply line PL2.

Based on the drive signal from control device 340, inverters 320 and 330 convert the DC voltage from capacitor C2 into an alternating-current (AC) voltage, to drive motor generators MG1 and MG2.

Control device 340 calculates each phase coil voltage of motor generators MG1 and MG2 based on the motor torque command value, each phase current value of motor generators MG1 and MG2, and the input voltage of inverters 320 and 330, and, based on the calculation results, generates a PWM (Pulse Width Modulation) signal used for turning on/off power transistors Q3 to Q14 and outputs the same to inverters 320 and 330.

Furthermore, control device 340 calculates a duty ratio of power transistors Q1 and Q2 for optimizing the input voltage of inverters 320 and 330 based on the above-mentioned motor torque command value and the motor rotation number, and then, based on the calculation results, generates a PWM signal used for turning on/off power transistors Q1 and Q2 and outputs the same to converter 310.

Furthermore, control device 340 controls the switching operation of power transistors Q1 to Q14 in converter 310 and inverters 320, 330 in order to convert the AC power generated by motor generators MG1 and MG2 into a DC power for charging battery B.

Figure 3:
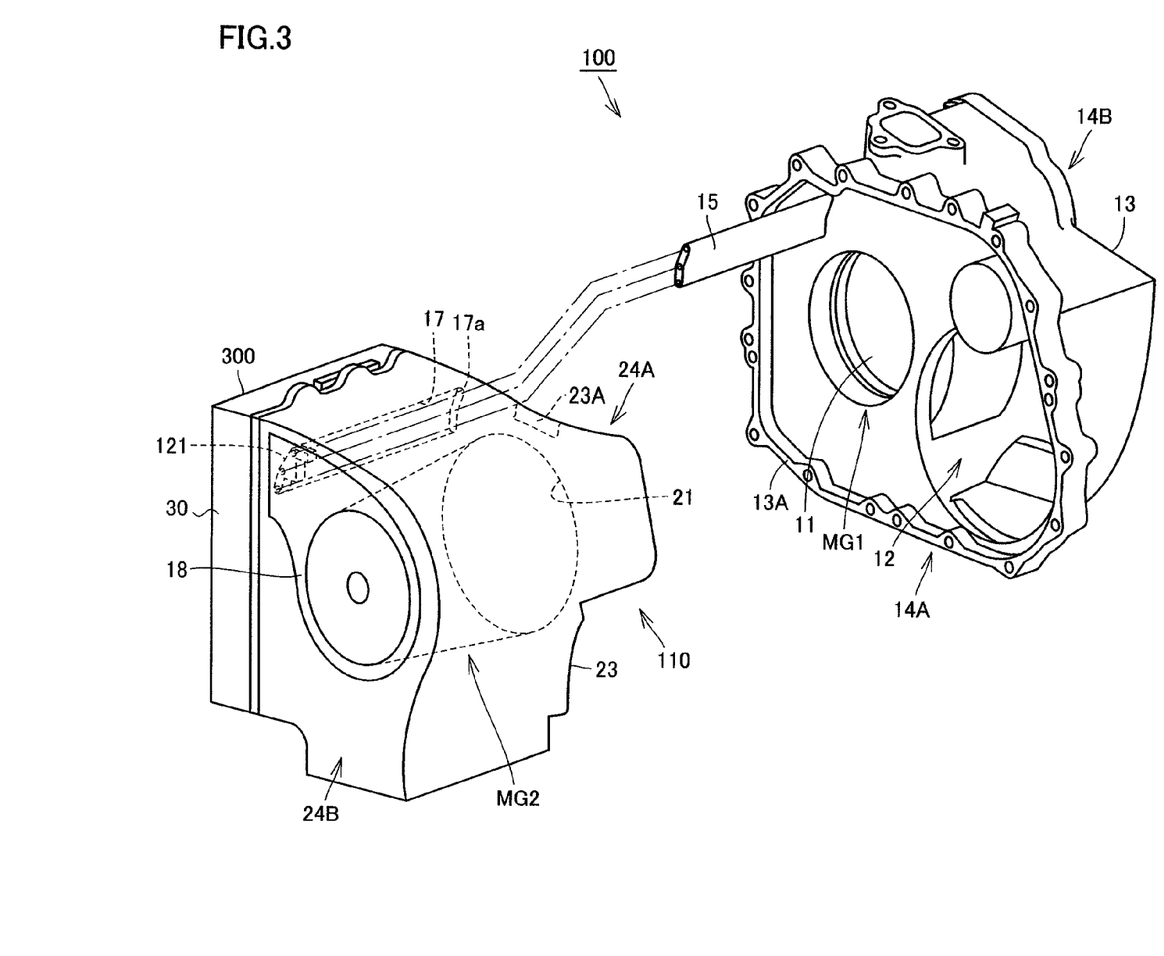
FIG. 3 is a perspective view showing a schematic configuration of a housing.

FIG. 3 is a perspective view showing the schematic configuration of housing 110. In the example shown in FIG. 3, housing 110 includes a divided housing case (first housing case) 23 in which motor generator MG2 and PCU 300 can be housed, and a divided housing case (second housing case) 13 in which motor generator MG1 can be housed.

Divided housing case 23 includes a rotating electric machine housing chamber (first rotating electric machine housing portion) 21 housing motor generator MG2, and a PCU housing case (inverter housing portion) 30 housing PCU 300.

Divided housing case 23 is provided with an outer peripheral surface including side surfaces 24A and 24B which are located with respect to the direction in which the rotation shaft of motor generator MG2 housed therein extends. Side surface 24A serves as a mounting surface which is to be attached to divided housing case 13.

Divided housing case 13 includes a rotating electric machine housing chamber 11 housing motor generator MG1, and a gear mechanism housing chamber 12 housing differential gear 150 and the like.

Divided housing case 13 is provided with an outer peripheral surface including side surfaces 14A and 14B which are located with respect to the direction in which the rotation shaft of motor generator MG1 housed within divided housing case 13 extends. Side surface 14A serves as a mounting surface which is to be attached to side surface 24A of divided housing case 23. It is to be noted that a peripheral edge portion 13A of side surface 14A of divided housing case 13 and at least a part of a peripheral edge portion 23A of side surface 24A of divided housing case 23 can be brought into contact with each other. Peripheral edge portion 13A and peripheral edge portion 23A are brought into contact with each other and fastened to each other by a bolt or the like, which allows divided housing case 13 and divided housing case 23 to be integrated with each other. Thus, housing 110 shown in FIG. 1 is formed.

In the example shown in FIG. 3, on side surface 14A of divided housing case 13, a bus bar 15 is provided so as to project from side surface 14A. Bus bar 15 is connected to each coil via U-phase terminal 122U, V-phase terminal 122V and W-phase terminal 122W of motor generator MG1. It is to be noted that, in the example shown in FIG. 3, bus bar 15 extends in the direction in which the rotation shaft of motor generator MG1 extends. It is also to be noted that the rotation shaft of motor generator MG1 and the rotation shaft of motor generator MG2 extend in the same direction, that is, extend from side surfaces 14A and 24A of divided housing cases 13 and 23 toward side surfaces 14B and 24B, respectively.

Divided housing case 23 has an insertion portion (hole portion) 17 formed therein, which extends from an opening 17a provided in side surface 24A in the direction in which bus bar 15 projects. Bus bar 15 is inserted into insertion portion 17. Terminal 121 connected to inverter 320 of PCU 300 is provided within insertion portion 17.

In the example shown in FIG. 3, as with bus bar 15, insertion portion 17 also extends in the direction in which the rotation shaft of each of motor generators MG1 and MG2 extends. Accordingly, bus bar 15 is disposed so as to project from side surface 14A toward terminal 121.

Divided housing case 23 has side surface 24B provided with a detachable portion 18 which is provided detachably from side surface 24B. With respect to insertion portion 17, side surface 24B is located with respect to the direction in which insertion portion 17 extends. In insertion portion 17, terminal 121 is located at the greatest distance from opening 17a, in which terminal 121 and side surface 24B are located adjacent to each other.

When assembling drive device 100 as described above, bus bar 15 is inserted into insertion portion 17, and divided housing case 13 and divided housing case 23 are brought adjacent to each other such that peripheral edge portion 13A of divided housing case 13 and peripheral edge portion 23A of divided housing case 23 are brought into contact with each other. When peripheral edge portion 13A and peripheral edge portion 23A are brought into contact with each other, the tip portion of bus bar 15 comes into contact with terminal 121. Divided housing case 13 and divided housing case 23 are then fastened to each other by a bolt or the like, to cause divided housing case 13 and divided housing case 23 to be integrated with each other.

Then, detachable portion 18 is removed and terminal 121 and bus bar 15 are fastened to each other by a bolt or the like, which allows each coil of motor generator MG1 to be connected to inverter 320 shown in FIG. 2.

Thus, according to drive device 100 shown in FIG. 3, the process of assembling divided housing case 13 and divided housing case 23 and the process of connecting bus bar 15 to terminal 121 can be simultaneously performed, with the result that the assembly process can be simplified.

Furthermore, in the case where terminal 121 and bus bar 15 are fastened to each other by a bolt, bus bar 15 is inserted into insertion portion 17 to prevent bus bar 15 and terminal 121 from being relatively displaced in position. Consequently, terminal 121 and bus bar 15 can be readily fastened to each other.

Figure 4:
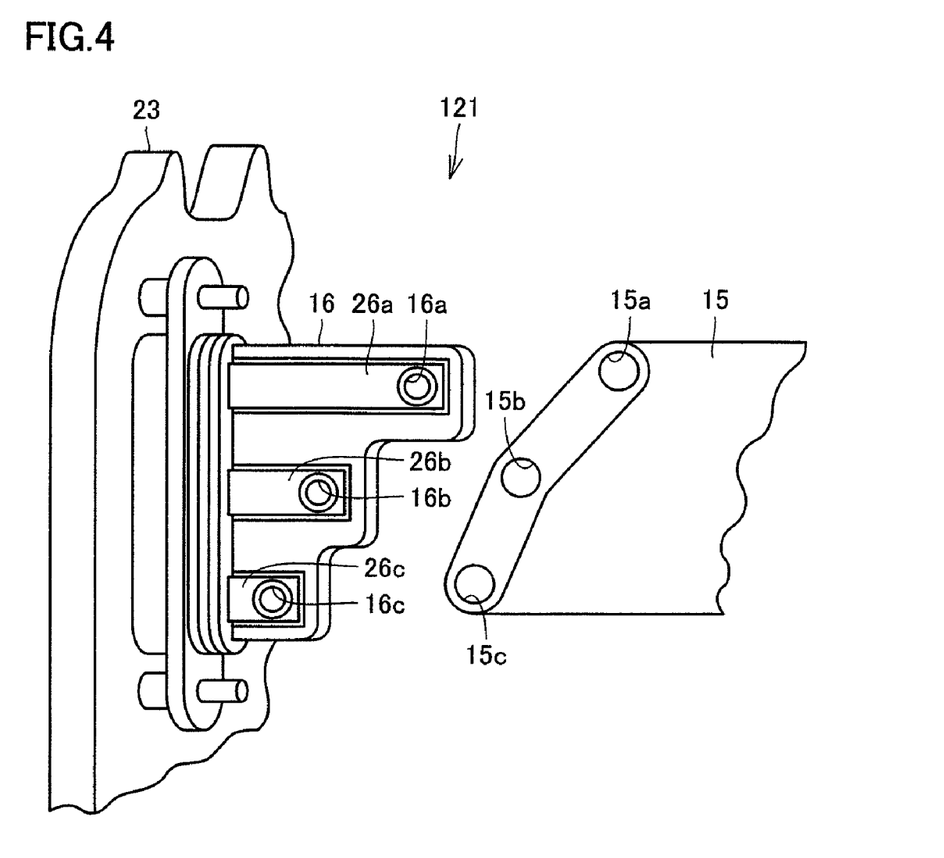
FIG. 4 is a perspective view showing a schematic configuration of a terminal and a bus bar.

FIG. 4 is a perspective view showing the schematic configuration of terminal 121 and bus bar 15. As shown in FIG. 4, hole portions 15a, 15b and 15c are formed at the tip portion of bus bar 15.

Embedded within bus bar 15 are lead wires which are connected via U-phase terminal 121U, V-phase terminal 121V and W-phase terminal 121W of motor generator MG1 to the U-phase coil, the V-phase coil and the W-phase coil, respectively. Each of the lead wires extends to the vicinity of the opening edge of each of hole portions 15a, 15b and 15c. The inner peripheral surface defining each of hole portions 15a, 15b and 15c in bus bar 15 has an internal thread formed therein, into which the bolt can be screwed.

Terminal 121 is provided with connecting portions 26a, 26b and 26c to which U-phase arm 321U, V-phase arm 321V and W-phase arm 321W shown in FIG. 2 are connected, respectively.

Hole portions 16a, 16b and 16c corresponding to hole portions 15a, 15b and 15c in bus bar 15 are formed in connecting portions 26a, 26b and 26c, respectively.

In the state where bus bar 15 and terminal 121 are brought adjacent to each other as described above, hole portions 16a, 16b and 16c and hole portions 15a, 15b and 15c of bus bar 15 are arranged in the direction in which insertion portion 17 shown in FIG. 3 extends.

Accordingly, when detachable portion 18 is removed, the bolt can be readily inserted into each of hole portions 16a, 16b and 16c and hole portions 15a, 15b and 15c. Consequently, while the lead wires extending to hole portions 16a, 16b and 16c and connected to the coils of motor generator MG1 can be electrically connected to connecting portions 26a, 26b and 26c, respectively, bus bar 15 and terminal 121 can be fastened to each other. As described above, in the example shown in FIG. 4, bus bar 15 and terminal 121 can also be readily connected to each other, and accordingly, the operation of assembling drive device 100 can be simplified.

Furthermore, for example, when motor generators MG1, MG2 and the like are subjected to maintenance, detachable portion 18 shown in FIG. 3 is removed and the bolt fastening bus bar 15 to terminal 121 is then loosened, with the result that bus bar 15 and terminal 121 which are in the fastened and connected state can readily be disengaged from each other. Thus, according to drive device 100, the workload can be reduced even in the case of the disassembling operation in maintenance and the like.

Although, in the example shown in FIG. 3, terminal 121 is provided on the divided housing case 23 side in which PCU 300 is housed and bus bar 15 is projected from divided housing case 13 toward terminal 121, the present invention is not limited thereto.

Figure 5:
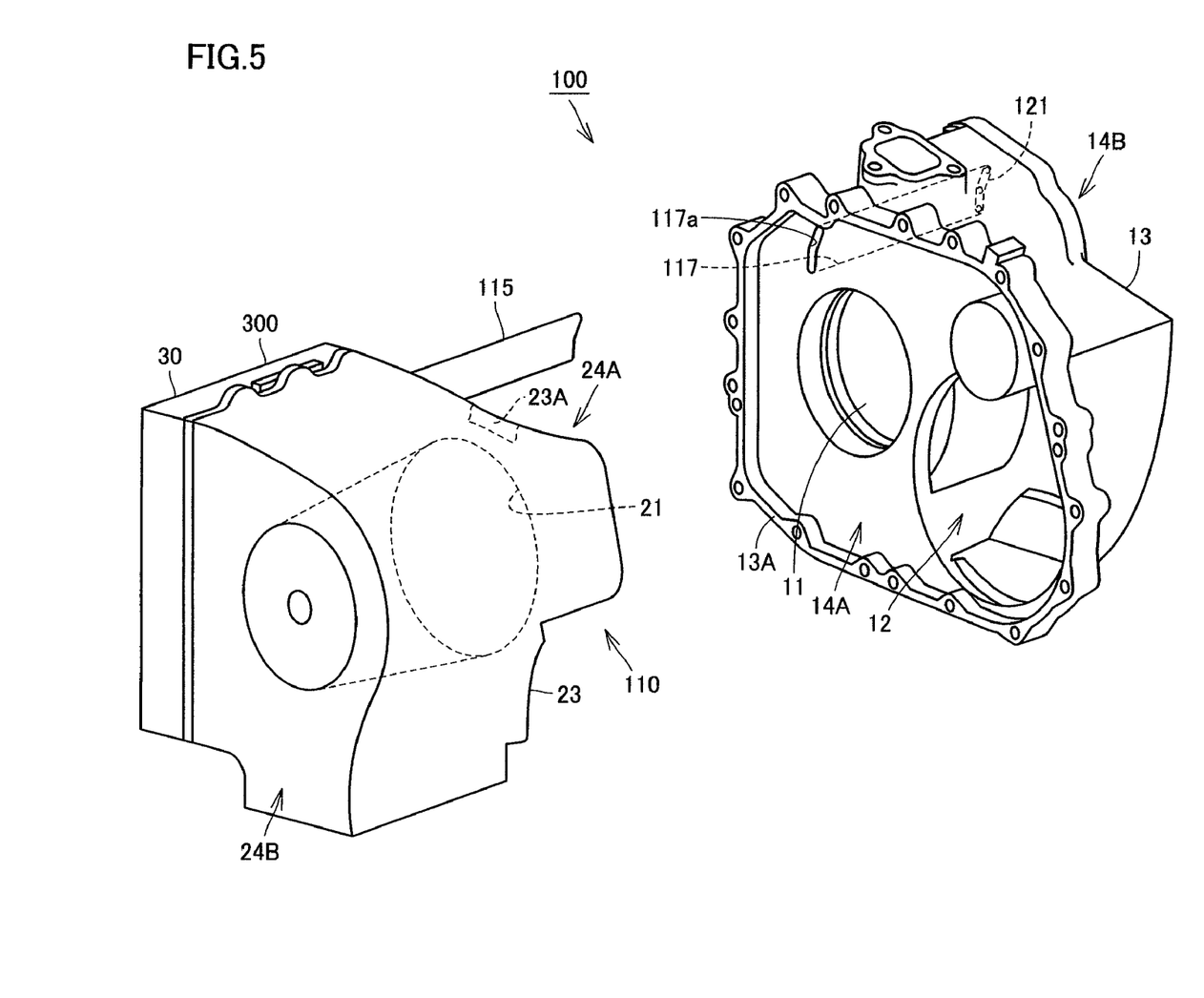
FIG. 5 is a perspective view showing a first modification of the drive device according to the embodiment.

FIG. 5 is a perspective view showing the first modification of drive device 100 according to the present embodiment. In the example shown in FIG. 5, divided housing case 23 is provided with a bus bar 115 projecting toward divided housing case 13, and divided housing case 13 has an insertion portion 117 formed therein, into which bus bar 115 is inserted.

Each phase arm of inverter 320 of PCU 300 is connected to bus bar 115. Bus bar 115 also has three hole portions formed at the tip portion, in which each hole portion has an internal thread formed on its inner peripheral surface.

Furthermore, on the bottom side within insertion portion 117, terminal 121 is provided, to which each coil of motor generator MG1 is connected. It is to be noted that insertion portion 117 extends through an opening 117a formed in side surface 14A of divided housing case 13 in the direction in which the rotation shaft of motor generator MG1 extends.

A detachable portion that can be detached is provided on side surface 14B in the peripheral surface of divided housing case 13 which is, with respect to insertion portion 117, located with respect to the direction in which insertion portion 117 extends.

Bus bar 115 is inserted into insertion portion 117, and divided housing case 23 and divided housing case 13 are brought adjacent to each other and fastened to each other by a bolt or the like.

The detachable portion provided on side surface 14B is then removed, and terminal 121 and bus bar 115 are fastened to each other by a bolt or the like, which allows each phase coil of motor generator MG1 and each phase arm of inverter 320 to be connected to each other.

Figure 6:
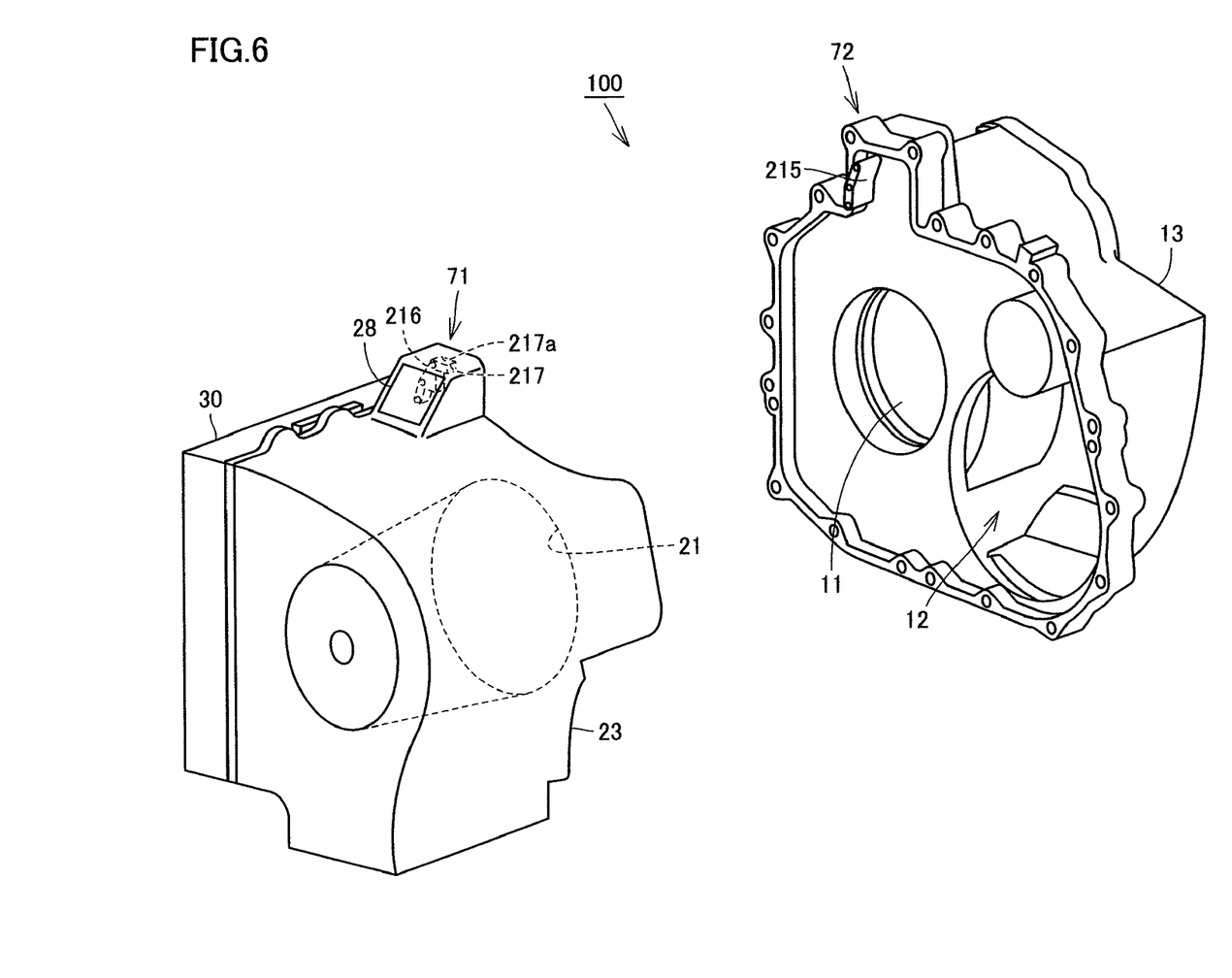
FIG. 6 is a perspective view showing a second modification of the drive device according to the embodiment.

FIG. 6 is a perspective view showing the second modification of drive device 100 according to the present embodiment. As shown in FIG. 6, it may be that divided housing case 13 is provided with a protruded portion 72, divided housing case 23 is also provided with a protruded portion 71, protruded portion 72 is provided with a bus bar 215, and protruded portion 71 is provided with an insertion portion 217 and terminal 121.

Bus bar 215 is provided on the side surface in the outer peripheral surface of protruded portion 72 which faces divided housing case 23. Insertion portion 217 is provided on the side surface in the outer peripheral surface of protruded portion 71 which faces divided housing case 13.

A detachable portion 28 that can be detached is provided on the side surface in the outer peripheral surface of protruded portion 71 which is, with respect to insertion portion 217, located with respect to the direction in which insertion portion 217 extends.

When divided housing case 23 and divided housing case 13 are integrally fastened to each other, bus bar 215 is inserted into insertion portion 217, which are brought adjacent to each other or brought into contact with each other. Detachable portion 28 is then removed to allow bus bar 215 and a terminal 216 to be connected to each other by a bolt or the like. It is to be noted that, in the example shown in FIG. 6, bus bar 215 can be reduced in length and readily inserted into insertion portion 217, which allows the assembly efficiency to be improved.

Although the embodiments of the present invention have been described as above, it should be understood that the embodiments disclosed herein are illustrative and non-restrictive in every respect. The scope of the present invention is defined by the terms of the claims, and is intended to include any modifications within the scope and meaning equivalent to the terms of the claims.

INDUSTRIAL APPLICABILITY

The present invention relates to a drive device and is particularly suitable for a drive device configured by combining a plurality of housing cases housing a rotating electric machine and an inverter.

The invention claimed is:
1. A drive device, comprising:
first and second rotating electric machines;
an inverter capable of supplying electric power to said first and second rotating electric machines;
a first housing case having a first rotating electric machine housing portion capable of housing said first rotating electric machine and an inverter housing portion capable of housing said inverter;
a second housing case capable of housing said second rotating electric machine and capable of being attached to said first housing case;
a first terminal portion provided at said first housing case and connected to said inverter;
an insertion portion formed in said first housing case, said insertion portion extending from an opening provided on a first side surface of said first housing case which faces said second housing case and toward an opposite second side surface of said first housing case, wherein said first terminal portion is disposed at an end of the insertion portion so as to be adjacent to the second side surface of said first housing case;
a second terminal portion provided at said second housing case and connected to said second rotating electric machine, wherein said second terminal portion projects from a first side surface of the second housing case which faces the first side surface of the first housing case,
wherein when said first housing case attaches to said second housing case, said second terminal portion simultaneously inserts into said insertion portion so that said first terminal portion and said second terminal portion are connected to each other; and a detachable portion is detachably provided on the second side surface of said first housing case so as to enable access to the first terminal portion connected to the second terminal portion in the insertion portion.

2. A drive device, comprising:

first and second rotating electric machines;

an inverter capable of supplying electric power to said first and second rotating electric machines;

a first housing case having a first rotating electric machine housing portion capable of housing said first rotating electric machine and an inverter housing portion capable of housing said inverter;

a first terminal portion provided at said first housing case and connected to said inverter:

a second housing case capable of housing said second rotating electric machine and capable of being attached to said first housing case;

a second terminal portion provided in said second housing case and connected to said second rotating electric machine;

said first terminal portion projecting from a first side surface of the first housing case which faces a first side surface of the second housing case;

an insertion portion formed in said second housing case, said insertion portion extending from an opening provided on the first side surface of said second housing case which faces said first housing case and toward an opposite second side surface of said second housing case, wherein said second terminal portion is disposed at an end of the insertion portion so as to be adjacent to the second side surface of said second housing case, wherein, when said first housing case attaches to said second housing case, said first terminal portion simultaneously inserts into said insertion portion so that said first terminal portion and said second terminal portion are connected to each other, a detachable portion detachably provided on the second side surface of said second housing case so as to enable access to the second terminal portion connected to the first terminal portion in the insertion portion.

3. A drive device, comprising:

first and second rotating electric machines;

an inverter capable of supplying electric power to said first and second rotating electric machines;

a first housing case capable of housing said first rotating electric machine and capable of being attached to said second housing case;

a second housing case having a second rotating electric machine housing portion capable of housing said first rotating electric machine and an inverter housing portion capable of housing said inverter;

a first protruding portion which protrudes from the first housing case in a direction different from a direction in which a rotation shaft of the first rotating electric machine extends;

a second protruding portion which protrudes from the second housing case in a direction different from a direction in which a rotation shaft of the second rotating electric machine extends, the direction being substantially parallel with the first protruding portion;

an insertion portion provided in the first protruding portion;

a first terminal portion provided in the insertion portion;

a second terminal portion provided in the second protruding portion; and a detachable portion provided on a side surface of an outer peripheral surface of the first protruding portion adjacent to the first terminal portion, wherein, when said first housing case attaches to said second housing case, said second terminal portion simultaneously inserts into said insertion portion so that said first terminal portion and said second terminal portion are connected to each other, and said detachable portion is detachable to allow access to the first and second terminal portion connected to each other.

* * * * *